United States Patent
Jackson et al.

(10) Patent No.: US 7,950,693 B2
(45) Date of Patent: May 31, 2011

(54) DUAL STAGE INFLATOR

(75) Inventors: Scott A. Jackson, Centerville, UT (US); Kevin R. Smith, Bountiful, UT (US)

(73) Assignee: Autoliv ASP, Inc., Ogden, UT (US)

( * ) Notice: Subject to any disclaimer, the term of this patent is extended or adjusted under 35 U.S.C. 154(b) by 151 days.

(21) Appl. No.: 12/154,065

(22) Filed: May 20, 2008

(65) Prior Publication Data
US 2009/0288574 A1 Nov. 26, 2009

(51) Int. Cl.
*B60R 21/26* (2006.01)

(52) U.S. Cl. ......... 280/741; 280/736; 280/742; 102/530

(58) Field of Classification Search .................. 102/530, 102/531, 217, 202, 202.5, 202.14; 280/728.1, 280/736, 741, 737
See application file for complete search history.

(56) References Cited

U.S. PATENT DOCUMENTS

| | | | |
|---|---|---|---|
| 5,938,235 A * | 8/1999 | Butt .............................. | 280/737 |
| 6,032,979 A | 3/2000 | Mossi et al. | |
| 6,142,515 A | 11/2000 | Mika | |
| 6,189,924 B1 | 2/2001 | Hock | |
| 6,199,906 B1 * | 3/2001 | Trevillyan et al. ............ | 280/741 |
| 6,364,353 B2 | 4/2002 | Green, Jr. et al. | |
| 6,422,601 B1 | 7/2002 | Quioc | |
| 6,474,684 B1 * | 11/2002 | Ludwig et al. ................ | 280/741 |
| 6,491,321 B1 * | 12/2002 | Nakashima et al. .......... | 280/736 |
| 6,547,275 B2 * | 4/2003 | Nakashima et al. .......... | 280/736 |
| 6,557,888 B1 * | 5/2003 | Nakashima et al. .......... | 280/735 |
| 6,659,500 B2 * | 12/2003 | Whang et al. ................. | 280/741 |
| 6,669,230 B1 * | 12/2003 | Katsuda et al. ............... | 280/735 |
| 6,722,694 B1 * | 4/2004 | Nakashima et al. .......... | 280/736 |
| 6,739,621 B2 | 5/2004 | Parkinson et al. | |
| 6,848,713 B2 * | 2/2005 | Nakashima et al. .......... | 280/741 |
| 6,886,855 B2 | 5/2005 | Cheal et al. | |
| 6,966,578 B2 | 11/2005 | Smith | |
| 6,997,477 B2 | 2/2006 | Quioc | |
| 7,044,502 B2 | 5/2006 | Trevillyan et al. | |
| 7,104,569 B2 * | 9/2006 | Goetz ............................ | 280/736 |
| 7,267,365 B2 | 9/2007 | Quioc | |
| 2002/0005636 A1 * | 1/2002 | McFarland et al. ........... | 280/736 |
| 2002/0050703 A1 * | 5/2002 | Whang et al. ................. | 280/737 |
| 2002/0101068 A1 * | 8/2002 | Quioc ............................ | 280/741 |
| 2002/0144621 A1 * | 10/2002 | McFarland et al. ........... | 102/530 |
| 2002/0167155 A1 * | 11/2002 | Nakashima et al. .......... | 280/741 |
| 2003/0070574 A1 * | 4/2003 | Rink et al. .................... | 102/530 |
| 2003/0121578 A1 * | 7/2003 | Parkinson et al. ............. | 149/73 |
| 2003/0127840 A1 * | 7/2003 | Nakashima et al. .......... | 280/741 |
| 2003/0146611 A1 * | 8/2003 | Kenney et al. ................ | 280/736 |
| 2003/0160437 A1 * | 8/2003 | Ohji et al. ..................... | 280/736 |
| 2003/0184068 A1 * | 10/2003 | Nakashima et al. .......... | 280/741 |
| 2003/0234526 A1 * | 12/2003 | Quioc ............................ | 280/736 |
| 2004/0046373 A1 * | 3/2004 | Wang et al. ................... | 280/741 |
| 2004/0061319 A1 * | 4/2004 | Saso et al. ..................... | 280/741 |
| 2004/0163565 A1 | 8/2004 | Gabler et al. | |

(Continued)

*Primary Examiner* — Benjamin P Lee
(74) *Attorney, Agent, or Firm* — Sally J. Brown; Pauley Petersen & Erickson

(57) ABSTRACT

A dual stage inflator device including a housing defining first and second chamber each containing a quantity of gas generant material ignitable to produce combustion products. A divider plate, separating the first chamber from the second chamber, is disposed and fixed within the housing. The divider plate includes an opening to allow gas flow communication from the second chamber to the first chamber. A removable plug element is normally disposed in the divider plate opening to prevent gas flow communication between the first chamber and the second chamber when in a static state.

20 Claims, 4 Drawing Sheets

U.S. PATENT DOCUMENTS

2004/0195813 A1* 10/2004 Canterberry et al. ......... 280/741
2005/0035579 A1* 2/2005 Canterberry et al. ......... 280/741
2005/0184498 A1* 8/2005 Trevillyan et al. ............ 280/741
2006/0267322 A1* 11/2006 Eckelberg .................... 280/736
2007/0090635 A1* 4/2007 Okamoto et al. ............. 280/741
2008/0136152 A1* 6/2008 McFarland ................... 280/736
2008/0211215 A1* 9/2008 Hoffman et al. .............. 280/736
2008/0257195 A1* 10/2008 Nakayasu et al. ............ 102/530

* cited by examiner

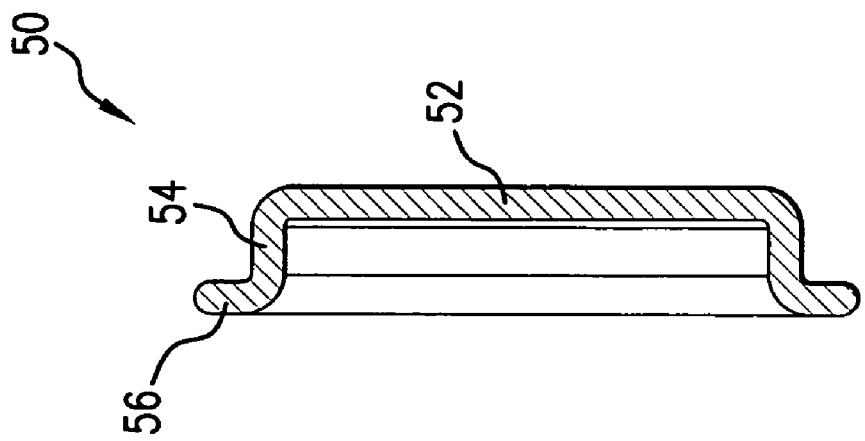
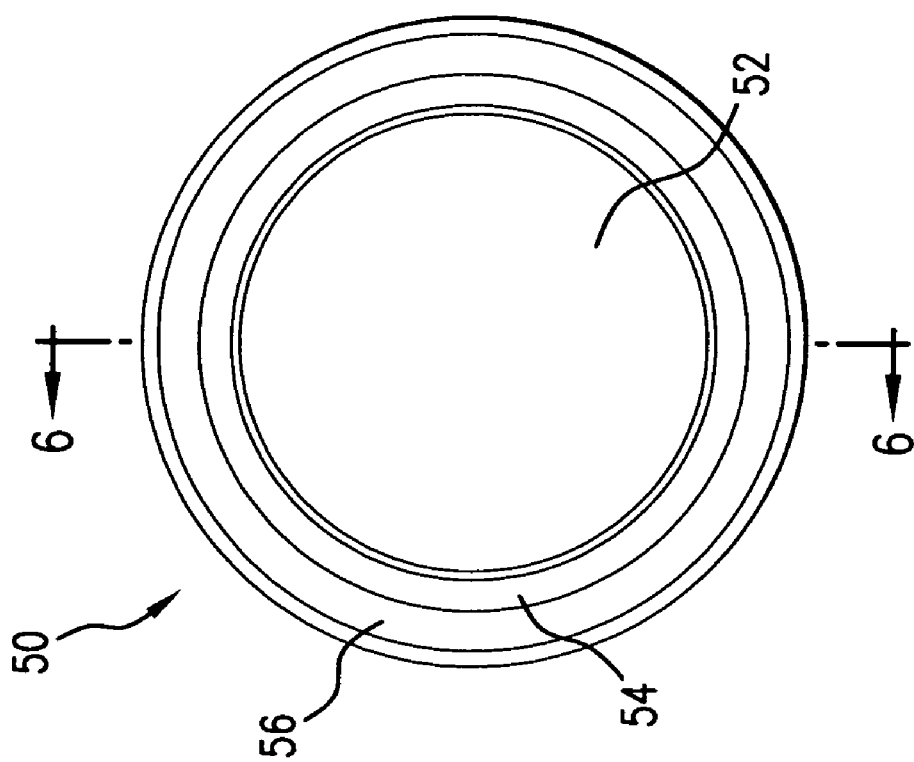

DUAL STAGE INFLATOR

BACKGROUND OF THE INVENTION

This invention relates generally to inflators for use in inflating inflatable restraint airbag cushions, such as used to provide impact protection to occupants of motor vehicles. More particularly, the invention relates to inflator devices having multiple or plural stages or levels of inflation gas output and as such may be used to provide an inflation gas output which is adaptive to factors such as one or more crash and occupant conditions.

It is well known to protect a vehicle occupant using a cushion or bag, e.g., an "airbag," that is inflated or expanded with gas when the vehicle encounters sudden deceleration, such as in the event of a collision. In such systems, the airbag cushion is normally housed in an uninflated and folded condition to minimize space requirements. Upon actuation of the system, the cushion begins being inflated in a matter of no more than a few milliseconds with gas produced or supplied by a device commonly referred to as an "inflator."

Various types of inflator devices have been disclosed in the art for the inflation of an airbag such as used in inflatable restraint systems. One type of known inflator device derives inflation gas from a combustible pyrotechnic gas generating material which, upon ignition, generates a quantity of gas sufficient to inflate the airbag.

In view of possibly varying operating conditions and, in turn, possibly varying desired performance characteristics, there is a need and a desire to provide what has been termed an "adaptive" inflator device and a corresponding inflatable restraint system. With an adaptive inflator device, output parameters such as one or more of the quantity, supply, and rate of supply of inflation gas, for example, can be selectively and appropriately varied dependent on selected operating conditions such as one or more of ambient temperature, occupant presence, seat belt usage and rate of deceleration of the motor vehicle, for example.

Pyrotechnic inflator typically may have one or more chambers containing gas generant. Adaptive pyrotechnic inflators having gas generant material in two chambers, which are independently ignited by two igniters have been referred to as "dual stage" inflators. In practice, each such gas generant material-containing chamber is oftentimes referred to as a "combustion chamber" as the gas generant material therein contained is burned or otherwise reacted to produce or form gas such as may be used to inflate an associated inflatable restraint airbag cushion.

Dual stage inflators may have several contemplated firing scenarios. In a first such scenario, only the gas generant material in a first or primary chamber is actuated whereby a fixed quantity of inflation gas is produced thereby. In a second possible firing scenario, the first or primary chamber is first actuated whereby gas generant material in the first chamber is first reacted to start to produce or form inflation gas and after a predetermined or preselected delay, the gas generant material in a second or secondary chamber is then actuated whereby gas generant material in the second chamber is reacted to also produce or form inflation gas. In a third possible firing scenario, the gas generant material in the first chamber and the gas generant material in the second chamber are actuated simultaneously to produce or form inflation gas from the gas generant material in each of the chambers.

As will be appreciated, through the selection and use of an appropriate such firing scenario, inflator output parameters such as one or more of the quantity, supply, and rate of supply of inflation gas, for example, can be selectively and appropriately varied dependent on selected operating conditions such as one or more of ambient temperature, occupant presence, seat belt usage and rate of deceleration of the motor vehicle, for example.

Particular known adaptive inflator devices include commonly assigned U.S. Pat. No. 6,032,939, issued 7 Mar. 2000 to Mossi et al., and U.S. Pat. No. 6,189,927, issued 20 Feb. 2001 to Mossi et al., which teach such inflator devices that include two discrete and isolated chambers of gas generant materials and permit several distinct inflation performance scenarios while desirably employing a single set of inflation gas treatment components such as filters for the treatment of products of both chambers.

U.S. Pat. No. 7,044,502, issued 16 May 2006, discloses a dual stage inflator having a movable divider plate that separates gas generant material in a primary chamber from gas generant material in a secondary chamber. The patent discloses that before the inflator is fired, the divider plate rests against the inner surface of the lower housing. The divider plate thus prevents inflation gas from the primary chamber from igniting the secondary chamber. However, when the internal pressure of the secondary chamber exceeds the internal pressure of the primary chamber, the divider plate is displaced in an upward direction thereby permitting the inflation gas from the secondary chamber to flow around the divider plate and out of the inflator.

Reliance on movement of a chamber divider plate can lead to an inflator device experiencing undesired performance variability and may also lead to less efficient than desired control of the combustion pressure in one or both of the inflator device combustion chambers.

Adaptive inflator devices find widespread use in modern day vehicle occupant safety restraint systems. Such use leads to a need and desire for improved adaptive inflator devices such as capable of specifically varying selected inflation performance scenarios. Thus, there is a need and demand for adaptive inflator devices and associated methods of operation of increased simplicity and reliability of operation and design. In particular, there is a need and demand for adaptive inflator devices and associated methods of operation that provide or result in specifically desired inflation performance scenarios in a less costly and/or more efficient manner.

SUMMARY OF THE INVENTION

The present invention provides an improved inflator device and associated or corresponding methods of operation.

In a first aspect, the invention is a dual stage inflator device that includes a housing. The housing at least in part defines a first chamber containing a quantity of a first gas generant material ignitable to produce first combustion products including a first inflation gas. The housing also at least in part defines a second chamber containing a quantity of a second gas generant material ignitable to produce second combustion products including a second inflation gas. The inflator device also includes a divider plate disposed and fixed within the housing. The divider plate separates the first chamber from the second chamber. The divider plate includes a first opening to allow gas flow communication from the second chamber to the first chamber. The inflator device further includes a plug element disposed in the first opening of the divider plate to prevent gas flow communication between the first chamber and the second chamber through the first opening in a static state.

In another aspect, the invention provides a dual stage inflator device that, as described in greater detail below, includes a housing, first and second igniter devices, a divider plate, a filter element and a plug element. The housing includes a cup-shaped base portion and a diffuser cap portion. The housing at least in part defines a first chamber containing a quantity of a first gas generant material ignitable to produce first combustion products including a first inflation gas. The housing also at least in part defines a second chamber containing a quantity of a second gas generant material ignitable to produce second combustion products including a second inflation gas. The housing at least in part defining the first chamber includes a plurality of spaced apart gas exit ports to permit passage of first and second inflation gas from the inflator device. The first igniter device is operatively associated with the first chamber and the second igniter device operatively associated with the second chamber. The filter element is disposed within the first chamber adjacent the plurality of spaced apart gas exit ports for filtration of combustion products of the first and second chambers. The divider plate is disposed and fixed within the housing. The divider plate at least in part separates the first chamber from the second chamber. The divider plate includes a first opening to allow gas flow communication from the second chamber to the first chamber. The plug element is disposed in the first opening of the divider plate to prevent gas flow communication between the first chamber and the second chamber through the first opening in a static state. Upon actuation of the second igniter device, the second gas generant material ignites to produce the second combustion products including the second inflation gas and the plug element disposed in the first opening of the divider plate is displaced to permit gas flow communication from the second chamber into the first chamber through the first opening.

In another aspect, there is provided a method of operation for a dual stage inflator device that includes a housing, first and second igniter devices, a divider plate and a plug element. More particularly, the housing at least in part defines a first chamber containing a quantity of a first gas generant material ignitable to produce first combustion products including a first inflation gas. The housing also at least in part defines a second chamber containing a quantity of a second gas generant material ignitable to produce second combustion products including a second inflation gas. The housing at least in part defining the first chamber includes a plurality of spaced apart gas exit ports to permit passage of first and second inflation gas from the inflator device. The first igniter device is operatively associated with the first chamber. The second igniter device is operatively associated with the second chamber. The divider plate is disposed and fixed within the housing. The divider plate separates the first chamber from the second chamber and includes a first opening to allow gas flow communication from the second chamber to the first chamber. The plug element is disposed in the first opening of the divider plate to prevent gas flow communication between the first chamber and the second chamber through the first opening in a static state. In accordance with one such method of operation, the second igniter device is actuated to ignite the second gas generant material and to produce the second combustion products including the second inflation gas. The plug element disposed in the first opening of the divider plate is then displaced when the pressure against the plug element becomes sufficiently high to permit gas flow communication from the second chamber into the first chamber through the first opening.

As used herein, references to "dual stage inflator devices" are to be understood to refer to adaptive pyrotechnic inflators having gas generating material in two chambers which are independently ignited by two igniters.

References to the detection or sensing of "occupant presence" are to be understood to refer to and include detection and sensing of one or more of the size, weight, and/or position of a particular vehicle occupant under consideration.

References to inflator or inflation gas "output" are to be understood to refer to inflator performance output parameters such as the quantity, supply, and rate of supply of inflation gas. With "adaptive output inflators," the inflator output is generally dependent on selected operating conditions such as ambient temperature, occupant presence, seat belt usage and rate of deceleration of the motor vehicle, for example.

Other objects and advantages will be apparent to those skilled in the art from the following detailed description taken in conjunction with the appended claims and drawings.

BRIEF DESCRIPTION OF THE DRAWINGS

FIG. 5 is a top view of a plug element for an inflator device divider plate in accordance with one embodiment of the invention.

FIG. 6 is a cross sectional view of the plug element illustrated in FIG. 5 taken substantially along the line 6-6 of FIG. 5 and viewed in the direction of the arrows.

DESCRIPTION OF PREFERRED EMBODIMENTS

Figure 1:
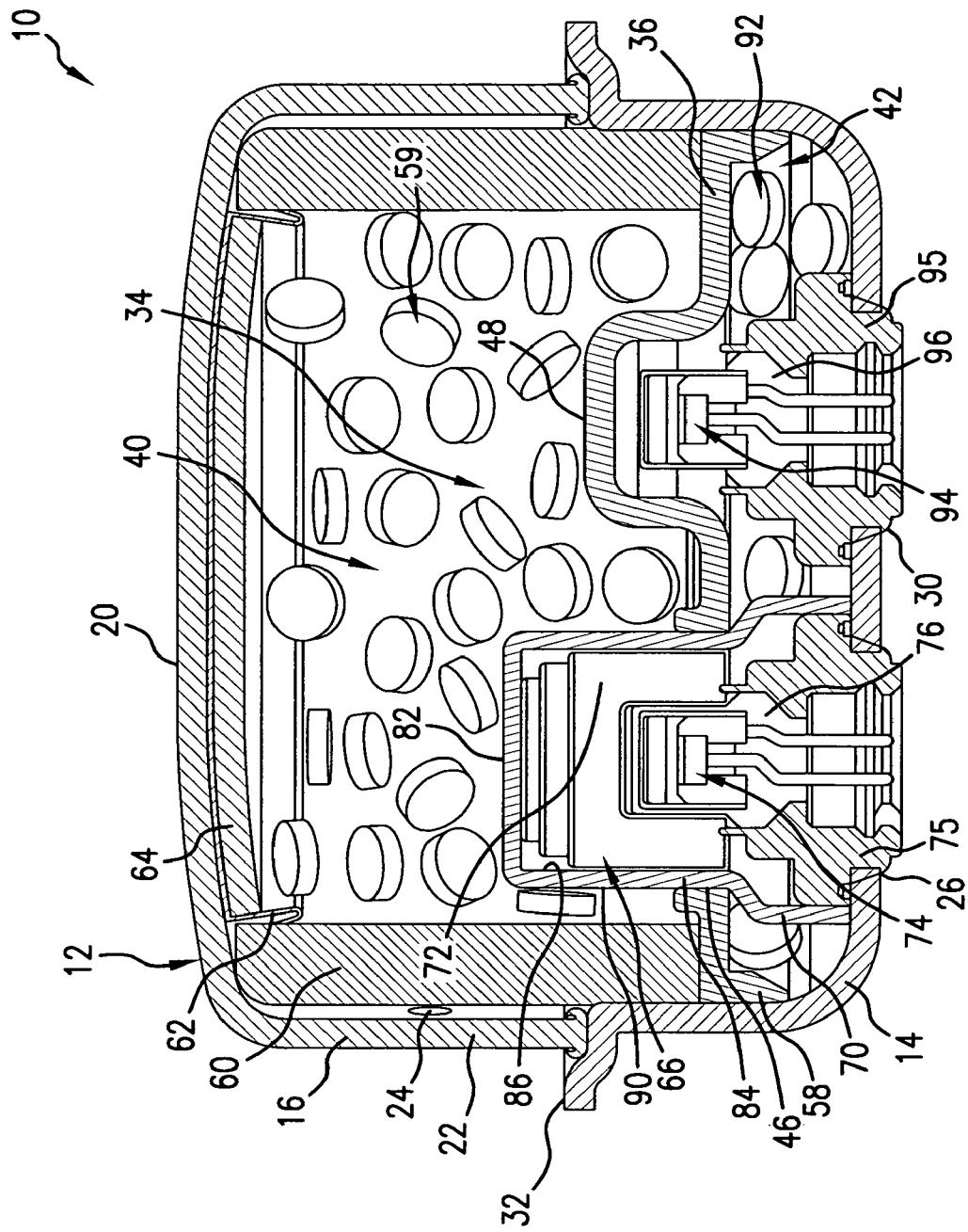
FIG. 1 is a simplified cross sectional view of an inflator device in accordance with one embodiment of the invention.
Figure 2:
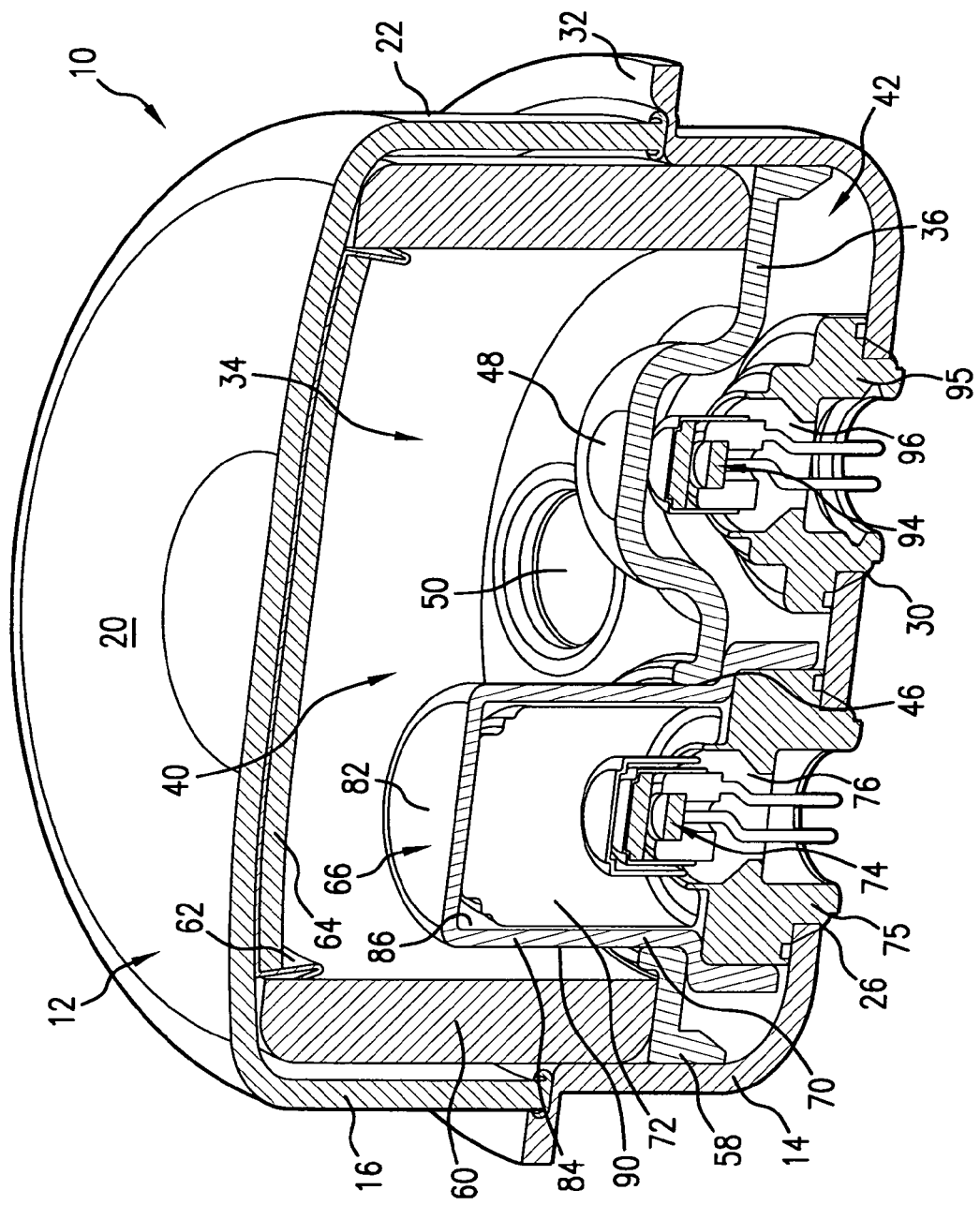
FIG. 2 is a simplified, elevated sectional view of an inflator device in accordance with one embodiment of the invention.

FIGS. 1 and 2 illustrate an adaptive output inflator assembly, generally designated with the reference numeral 10, and in accordance with a one embodiment of the invention. While the invention will be described hereinafter with particular reference to a passenger side airbag inflatable restraint system installation, it will be understood that the invention has general applicability to other types or kinds of airbag assemblies including, for example, driver side airbag assemblies such as for automotive vehicles including vans, pick-up trucks, and particularly automobiles.

The inflator assembly 10 has a generally cylindrical external outline and includes a housing construction 12 such as formed of two structural components, i.e., a lower shell or base portion 14 and an upper shell or diffuser cap portion 16, such as may desirably be made of metal or steel and appropriately joined or fastened together such as by application of an appropriate welding operation. The housing 12 is illustrated in the general form of a generally flattened, disk-shaped circular cylinder.

The diffuser cap portion 16 is in the general form of an inverted bowl and includes a top wall 20 and a cylindrical sidewall 22. The sidewall 22 includes a plurality of spaced, preferably, generally uniformly spaced gas exit ports 24.

The base portion 14 includes first and second mounting openings, designated by the reference numerals 26 and 30, respectively, the use of which will be discussed in greater detail below. The base portion 14 also includes a peripheral bracket or flange 32 that extends radially outward from the housing 12 and such as may serve to form an interface attachment which is used to attach the inflator assembly 10 to a vehicle the occupants of which are to be protected from injury tending to result from the impact of a collision.

The housing 12 is configured to define a central, generally cylindrical-shaped internal chamber 34. A divider plate 36 is disposed and fixed within the housing 12. The divider plate 36 separates or otherwise divides the chamber 34 to form a first chamber 40 and a second chamber 42.

Figure 3:
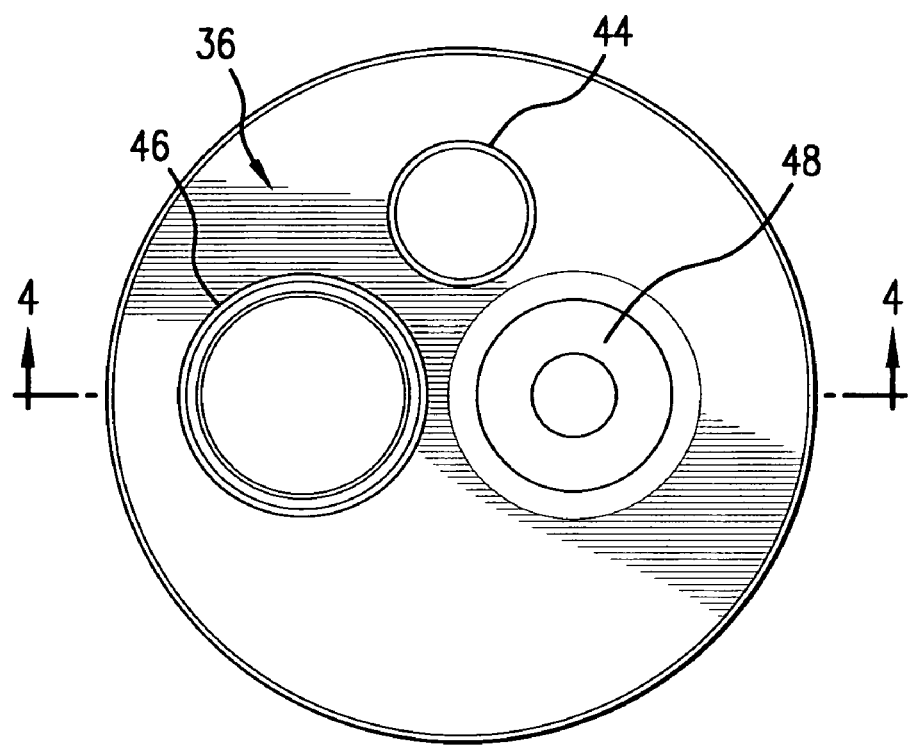
FIG. 3 is a top view of an inflator device divider plate in accordance with one embodiment of the invention.
Figure 4:
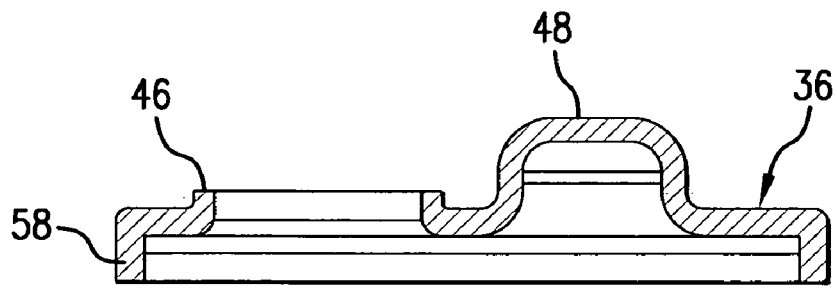
FIG. 4 is a simplified cross sectional view of inflator device divider plate shown in FIG. 3 taken substantially along the line 4-4 of FIG. 3 and viewed in the direction of the arrows.

The divider plate 36 is now further described in greater detail by making reference to FIGS. 3 and 4. The divider plate 36 is a generally planar element such as made or formed of stamped steel or the like. The divider plate 36 is desirably shaped and sized to be disposed and fixed within an associated inflator housing by press fit engagement. Thus, in the illustrated embodiment, the divider plate 36 desirably has a generally circular outer circumferential shape. Those skilled in the art and guided by the teachings herein provided will, however, appreciate that the broader practice of the invention is not necessarily so limited as divider plates with other outer peripheral shapes can and maybe used, if desired, in inflator assemblies wherein the housing is of an alternative shape or design.

The divider plate 36 include a first opening 44 such as to permit communication, particularly gas flow communication, between the first and second chambers 40 and 42, respectively.

As will be further described discussed below in connection with the construction of the inflator assembly 10, the divider plate 36 includes a first igniter assembly opening 46 and a generally circular protruding bulge, dome or hub 48.

As perhaps best seen by reference to FIG. 2, a plug element 50 is normally disposed in the divider plate first opening 44, such as via press fit engagement, to prevent gas flow communication between the first chamber 40 and the second chamber 42 through the opening 44 in a static state.

FIGS. 5 and 6 show the plug element 50 in greater detail. The plug element includes a base wall 52, a generally cylindrical sidewall 54 and a peripheral, radially outward extending shoulder wall portion 56. When press fit into the divider plate opening 44, the plug element 50 fits snuggly therein and with the plug element radially outward extending shoulder wall portion 56 typically snuggly adjacent the upper face of the divider plate 36, as perhaps best seen by reference to FIG. 2.

Those skilled in the art will appreciate that divider plate 36 is shown as including a circumferential sidewall 58 such as may serve to facilitate and permit the press fit placement of the divider plate 36 within the inflator housing 12.

Returning to FIGS. 1 and 2, the first chamber 40 contains or houses a supply of a first gas generant material 59, typically in the form of a pyrotechnic, such as known for use in airbag inflators. Surrounding the first gas generant material 59 is a filter assembly 60 such as may include one or more of a combustion screen or filter, such as formed of multiple layers or wraps of an expanded metal or, alternatively, a metal screen, a filter damper pad and the like types or kinds of airbag filter elements such as known in the art. If desired, the first gas generant material 59 may be suitably sealed, e.g., preferably hermetically sealed, within the inflator assembly 10 thereby protecting the gas generant material from ambient conditions, such as including moisture. In accordance with one embodiment, such sealing of the first gas generant material 59 within the inflator assembly 10 can be realized or achieved such as by placing a suitable seal element (not shown) generally adjacent the inner surface of the sidewall 22 in a surrounding relationship to the filter assembly 60. Various seal elements such as known in the art may be used. For example, suitable such seal elements may include or be in the form of an adhesive-backed foil seal. It is to be understood, however, that the broader practice of the invention is not necessarily limited by or to the inclusion of specific forms or types of seals.

The inflator assembly 10 also includes a retainer 62 and a generally circular cap damper pad 64 such as may serve as construction expedients serving one or more desirable functions, including, for example: retaining the inflator assembly components in proper relative arrangement, preventing undesired flow passage through the assembly and/or avoiding or minimizing undesired damage to the shape or form of the gas generant material contained therewithin and such as may result from movement by the gas generant material within the inflator assembly.

A first igniter assembly, generally designated by the reference numeral 66, is mounted to the inflator housing 12 via the first mounting opening 26. The first igniter assembly 66 may take the form of known pyrotechnic initiator devices such as include, as is known in the art, an igniter assembly housing 70 wherein is housed a canister 72, such as contains a charge of an appropriate igniter material such as known in the art and not here shown to facilitate illustration and comprehension. The first igniter assembly 66 also includes a first igniter device or squib 74, a first squib holder 75 whereby the igniter assembly 66 is mounted to or is mated with the housing 12, and a first squib adapter 76 joining the squib 74 to or with the holder 75. If desired, the igniter assembly may also include a squib seal, sealing the squib 74 with the adapter 76. As shown, the igniter assembly housing 70 can take the form of a generally concave member with a cap 82 and a generally cylindrical sidewall 84 forming an interior 86 and an exterior 90. As shown, the divider plate 36 and the igniter assembly housing 70 can desirably be in press fit engagement with the igniter assembly housing exterior 90 passing through and in contact with the divider plate first igniter assembly opening 46.

The igniter assembly housing 70 can be formed of a gas-impermeable material, such as metal, with the cap 82 being rupturable or including one or more, preferably a plurality of spaced, preferably, generally uniformly spaced gas exit orifices (not shown). If gas exit orifices are included, they may desirably be normally (e.g., when the inflator is in a static or prior to actuation state) covered by means of a pressure sensitive covering or barrier such as to prevent undesired passage of material therethrough. Such covering may, for example, take the form of an adhesive-backed foil seal wrap or the like as is well known in the art. As is known, such covering can be selected to open or rupture upon the application of a predetermined pressure thereagainst from the interior of the igniter assembly housing 70.

When actuated, the first igniter device 74 discharges or otherwise results in the rupture or opening of the ignition material canister 72. In turn, ignition of the igniter material normally contained therein customarily results in an increase in pressure within the igniter assembly housing 70. As will be appreciated and such as in a manner as known in the art, the igniter assembly cap 82 or normally closed or sealed opening or openings formed therein will rupture, open or otherwise permit passage of ignition products, produced by the combustion of the igniter material, and thus into contact with the gas generant material 59 contained within the first chamber 40. The resulting contact by or between the ignition products and the gas generant material results in the ignition and reaction of the gas generant material, with the gases produced by such reaction passing through the filter assembly 60 and subsequently passing through the gas exit ports 24 and out from the inflator assembly 10 into an associated airbag cushion (not shown). As will be appreciated, the contact of ignition products with the gas generant material can appropriately be, either or both, thermal or physical in nature.

As will be appreciated, the increased pressure within the first chamber 40 as a result of the reaction and gas production of the gas generant material therewithin contained serves to further secure the plug element 50 within the divider plate first opening 44 and prevent undesired gas flow communication between the first and second chambers.

The second chamber 42 contains or houses a supply of a second gas generant material 92. As will be appreciated by those skilled in the art and guided by the teaching herein provided, in accordance with specific preferred embodiments, the second gas generant material 92, housed in the second chamber 42, can be the same or different from the first gas generant material 59, housed in the first chamber 40. For example, second gas generant material 92 may be either the same or different in composition, shape, size or form, as compared to the first gas generant material 59.

The inflator assembly 10 further includes a second igniter device or squib 94, a second holder 95 whereby the second squib 94 is mounted to or is mated with the housing 12, and a squib adapter 96 joining the squib 94 to or with the holder 95. If desired, the assembly may also include a squib seal, sealing the squib 94 with the adapter 96.

As shown in FIGS. 1 and 2, the second igniter device or squib 94 can desirably be positioned aligned with the divider plate bulge or hub 48 such as to facilitate desired or proper operation of the second igniter device or squib 94 within the inflator assembly 10. In particular, when properly actuated, the second igniter device 94 can discharge or otherwise result in the ignition and reaction of the second gas generant material 92 contained or housed within the second chamber 42 and in the production of gaseous inflation products. With sufficient production of gaseous inflation products within the second chamber 42, the pressure within the second chamber 42 and acting against the plug element 50 also increases. When the pressure from within the second chamber 42 against the plug element 50 becomes sufficiently large, the plug element 50 is dislodged or displaced from its engagement with the divider plate first opening 44. Thus gas flow communication is permitted from the second chamber 42 into the first chamber 40. In particular, the gas products formed in the second chamber and passed into the first chamber can supplement the gas products formed in the first chamber and desirably be passed through the gas exit ports 24 and out from the inflator assembly 10 into an associated airbag cushion (not shown).

As will be appreciated, the inflator assembly 10 described above does not include gas exit ports in the portion of the inflator housing 12 defining or forming the second chamber 42. Rather, gas produced or formed within the second chamber 42 is directed through the divider plate first opening 44 and subsequently through the gas exit ports 24 and out from the inflator assembly 10 into an associated airbag cushion.

It will be appreciated that an inflator assembly in accordance with the invention can provide operation performance in accordance with selected operating conditions as may be required or desired for particular inflatable restraint system installations and applications. More specifically, an inflator assembly of the invention can be actuated in a manner such that either or both the quantity or rate of inflation gas production can be appropriately varied, such as at the time of a vehicle crash or collision incident, to take into account one or more conditions of occupant presence, as described above. Such inflator performance adaptability results from the subject inflator having two discrete and ballistically isolated chambers of gas generant materials. The subject inflator permits several distinct inflation performance scenarios:

For example, such an inflator assembly can be operated to have a first stage discharge whereby an igniter charge contained within the ignition material canister 72 is ignited to produce combustion products which are passed to the first gas generant chamber 40 to ignite the first gas generant material 59, such as described above, to produce inflation gas at a first output level without actuating or firing the second igniter device 94 or reacting or activating the gas generant material 92 contained in the second chamber 42. As will be appreciated, such operation may be desired to provide a minimized or reduced inflator output such as may be desired in an instance of a low speed collision, for example.

Alternatively, an inflator assembly in accordance with the invention can be operated such that both the first and second igniter devices, 74 and 94, respectively, are actuated.

As will be appreciated, such operation and ignition of both the first and second igniter devices and first and second gas generant materials can involve the simultaneous or near simultaneous actuation and firing of the first and second igniter devices (such as may be desired in order to provide a very rapid inflation and deployment of an associated airbag cushion, as may be desired in response to a high speed or severe vehicle collision) or the sequential actuation and firing of the first and second igniter devices (such as may be desired upon the occurrence of a moderately severe vehicle collision). Further, with such sequential actuation and firing, the time lag or delay between the actuation and firing of the first and second squibs and, in turn, the ignition of the first and second gas generant materials can be tailored to meet the specific requirements for a particular inflatable restraint system installation, as will be appreciated by those skilled in the art. Thus, such inflator assemblies are particularly suited for application as adaptive output inflators such as can be made generally dependent on one or more selected operating conditions such as ambient temperature, occupant presence, seat belt usage and rate of deceleration of the motor vehicle, for example.

The invention in its broader application is not limited to the use of a particular or specific gas generant. As those skilled in the art will appreciate, the invention can be practiced using a wide variety of gas generant materials which meet flame temperature, stability, filterability, toxicity, corrosivity, and gas generation requirements.

As will be appreciated, gas generant materials, e.g., pyrotechnics, useful in the practice of the invention can take various appropriate desired forms, including, for example, various extruded forms as well as granulated materials. The invention, in its broader practice, is not limited to particular or specific forms of gas generant materials.

Further, it is to be appreciated that while an inflator assembly in accordance with the invention may utilize a gas generant material of the same composition and physical form or parameters as both the first and second gas generant materials, the broader practice of the invention is not so limited. For example, it specifically may be desired that the first gas generant material be relatively slow burning so as to result in or provide a slower or gentler onset of inflation of the associated airbag cushion and that the second gas generant material be relatively quick burning to provide a quicker or faster inflation rate for the associated airbag and such as may be desired in the occurrence of the associated vehicle being involved in a relatively severe collision or crash. Such difference in performance can be realized through the use of gas generant materials of different composition as the first and second gas generant materials. Alternatively or additionally, the first and second gas generant materials can be in different physical form or have different physical parameters, e.g., shape and size. For example, to provide a faster or more rapid burning material it may be desirable to employ a form of the material having an increased or greater surface area.

As described above, the divider plate 36 serves to desirably isolate the second chamber 42 from the first chamber 40 unless the second igniter device 94 is properly actuated and the gas generant material contained within the second chamber 42 properly reacted.

Through the adaptive inflator design and operation described above, an overall reduction in component parts, a simplification and reduction in component part cost and/or design as well as improved packaging of gas generant material can be realized. More particularly, the divider plate of the subject inflator assembly can desirably be positioned within the inflator housing at various chosen positions such as to selectively vary the volumes of the first and second chambers and thus the amounts of gas generant materials contained therewithin such as to lead to achieving specifically desired performance splits for the operation of the inflator assembly first and second chambers. Thus, in practice, the subject inflator assembly permits the accommodation of various selected loads of the second gas generant material through the simple changing of the press depth of the divider plate with in the assembly.

The divider plate first opening can also be desirably sized to control the combustion pressure in the second chamber. This helps control the second stage performance and also provides or enhances the ability to optimize the combustion of generant in the second stage for improved gas effluent values.

Thus, the invention provides adaptive inflator devices and associated methods of operation of increased simplicity and reliability of operation and design. In particular, there is provided adaptive inflator devices and associated methods of operation that produce or result in specifically desired inflation performance scenarios in a less costly and/or more efficient manner.

The invention illustratively disclosed herein suitably may be practiced in the absence of any element, part, step, component, or ingredient which is not specifically disclosed herein.

While in the foregoing detailed description this invention has been described in relation to certain preferred embodiments thereof, and many details have been set forth for purposes of illustration, it will be apparent to those skilled in the art that the invention is susceptible to additional embodiments and that certain of the details described herein can be varied considerably without departing from the basic principles of the invention.

What is claimed is:

1. A dual stage inflator device comprising:
   a first and second igniter device;
   a housing, the housing at least in part defining a first chamber containing a quantity of a first gas generant material ignitable to produce first combustion products including a first inflation gas, the housing also at least in part defining a second chamber containing a quantity of a second gas generant material ignitable to produce second combustion products including a second inflation gas, the second chamber operatively associated with and at least in part containing the second igniter device to produce ignition products in direct ignition contact with the second gas generant material;
   a divider plate disposed and fixed within the housing, the divider plate separating the first chamber from the second chamber, the divider plate including a first opening to allow gas flow communication from the second chamber to the first chamber, the divider plate also including a second opening wherein the first igniter device is at least in part disposed to place the first igniter in operative association with the contents of the first chamber; and
   a plug element disposed in the first opening of the divider plate to prevent gas flow communication between the first chamber and the second chamber through the first opening in a static state.

2. The dual stage inflator device of claim 1 wherein the plug element is press fit secured within the first opening when said inflator device is in a static state.

3. The dual stage inflator device of claim 1 wherein the housing at least in part defining the first chamber includes a plurality of spaced apart gas exit ports to permit passage of first inflation gas from said inflator device.

4. The dual stage inflator device of claim 3 additionally comprising a filter element disposed within the first chamber adjacent the plurality of spaced apart gas exit ports for filtration of combustion products of the first chamber.

5. The dual stage inflator device of claim 3 wherein the spaced apart gas exit ports also permit passage of the second inflation gas from said inflator device.

6. The dual stage inflator device of claim 5 additionally comprising a filter element disposed within the first chamber adjacent the plurality of spaced apart gas exit ports for filtration of combustion products of the first and second chambers.

7. The dual stage inflator device of claim 1 wherein the housing comprises a cup-shaped base portion and a diffuser cap portion, the cup-shaped base portion including a first opening wherein the first igniter device is at least in part disposed, the cup-shaped base portion also including a second opening wherein the second igniter device is at least in part disposed, the first igniter device comprises an igniter housing disposed in the divider plate second opening to place the first igniter device in operative association with the contents of the first chamber.

8. The dual stage inflator device of claim 1 wherein upon actuation of the second igniter device the second gas generant material ignites to produce the second combustion products including the second inflation gas and the plug element disposed in the first opening of the divider plate is displaced to permit gas flow communication from the second chamber into the first chamber through the first opening.

9. The dual stage inflator device of claim 1 wherein at least a portion of the second inflation gas exits from the inflator assembly through spaced apart gas exit ports formed in the housing at least in part defining the first chamber.

10. The dual stage inflator device of claim 1 wherein a plurality of space apart gas exit ports are included in a portion of the housing at least in part defining the first chamber to permit passage of the first inflation gas from said inflator device.

11. A dual stage inflator device comprising:
   a housing comprises a cup-shaped base portion and a diffuser cap portion, the housing at least in part defining a first chamber containing a quantity of a first gas generant material ignitable to produce first combustion products including a first inflation gas, the housing also at least in part defining a second chamber containing a quantity of a second gas generant material ignitable to produce second combustion products including a second inflation gas, the housing at least in part defining the first chamber including a plurality of spaced apart gas exit ports to permit passage of first and second inflation gas from said inflator device;
   a first igniter device operatively associated with the first chamber;

a second igniter device operatively associated with the second chamber to produce ignition products in direct contact with the second gas generant material in the second chamber;
a filter element disposed within the first chamber adjacent the plurality of spaced apart gas exit ports for filtration of combustion products of the first and second chambers;
a divider plate disposed and fixed within the housing, the divider plate at least in part separating the first chamber from the second chamber, the divider plate including a first opening to allow gas flow communication from the second chamber to the first chamber, the divider plate also including a second opening wherein the first igniter device is at least in part disposed to place the first igniter device in operative association with the contents of the first chamber; and
a plug element disposed in the first opening of the divider plate to prevent gas flow communication between the first chamber and the second chamber through the first opening in a static state,
wherein upon actuation of the second igniter device, the second gas generant material ignites to produce the second combustion products including the second inflation gas and the plug element disposed in the first opening of the divider plate is displaced to permit gas flow communication from the second chamber into the first chamber through the first opening.

12. The dual stage inflator device of claim 11 wherein the plug element is press fit secured within the divider plate the first opening when said inflator device is in a static state.

13. The dual stage inflator device of claim 11 wherein cup-shaped base portion including a first opening wherein the first igniter device is at least in part disposed, the cup-shaped base portion also including a second opening wherein the second igniter device is at least in part disposed, the first igniter device comprises an igniter housing disposed in the divider plate second opening to place the first igniter device in operative association with the contents of the first chamber.

14. The dual stage inflator device of claim 11 wherein at least a portion of the second inflation gas exits from the inflator assembly through spaced apart gas exit ports formed in the housing at least in part defining the first chamber.

15. A method of operation for a dual stage inflator device that includes a housing at least in part defining a first chamber containing a quantity of a first gas generant material ignitable to produce first combustion products including a first inflation gas, the housing also at least in part defining a second chamber containing a quantity of a second gas generant material ignitable to produce second combustion products including a second inflation gas, the housing at least in part defining the first chamber including a plurality of spaced apart gas exit ports to permit passage of first and second inflation gas from the inflator device; a first igniter device operatively associated with the first chamber; a second igniter device operatively associated with the second chamber to produce ignition products in direct contact with the second gas generant material in the second chamber; the inflator device also including a divider plate disposed and fixed within the housing, the divider plate separating the first chamber from the second chamber, the divider plate including a first opening to allow gas flow communication from the second chamber to the first chamber, the divider plate also including a second opening wherein the first igniter device is at least in part disposed to place the first igniter device in operative association with the contents of the first chamber; and a plug element disposed in the first opening of the divider plate to prevent gas flow communication between the first chamber and the second chamber through the first opening in a static state, the method comprising:
actuating the second igniter device to ignite the second gas generant material and to produce the second combustion products including the second inflation gas; and
displacing the plug element disposed in the first opening of the divider plate when the pressure against the plug element becomes sufficiently high to permit gas flow communication from the second chamber into the first chamber through the first opening.

16. A dual stage inflator device comprising:
a housing, the housing at least in part defining a first chamber containing a quantity of a first gas generant material ignitable to produce first combustion products including a first inflation gas, the housing also at least in part defining a second chamber containing a quantity of a second gas generant material ignitable to produce second combustion products including a second inflation gas;
a divider plate disposed and fixed within the housing, the divider plate separating the first chamber from the second chamber, the divider plate including a first opening to allow gas flow communication from the second chamber to the first chamber, the divider plate also including a second opening wherein a first igniter device is at least in part disposed to place the first igniter device in operative association with the contents of the first chamber; and
a plug element disposed in the first opening of the divider plate to prevent gas flow communication between the first chamber and the second chamber through the first opening in a static state.

17. The dual stage inflator device of claim 16 wherein the plug element is press fit secured within the first opening when said inflator device is in a static state.

18. The dual stage inflator device of claim 16 wherein the housing at least in part defining the first chamber includes a plurality of spaced apart gas exit ports to permit passage of the first inflation gas and the second inflation gas from said inflator device.

19. The dual stage inflator device of claim 18 additionally comprising a filter element disposed within the first chamber adjacent the plurality of spaced apart gas exit ports for filtration of combustion products of the first chamber.

20. The dual stage inflator device of claim 16 additionally comprising:
a second igniter device operatively associated with the second chamber to produce ignition products in direct contact with the second gas generant material in the second chamber.

* * * * *